(12) United States Patent
Ryhorchuk

(10) Patent No.: US 6,999,686 B1
(45) Date of Patent: Feb. 14, 2006

(54) WAVELENGTH MANAGEMENT IN AN OPTICAL NETWORK

(75) Inventor: Kent Ryhorchuk, Sunnyvale, CA (US)

(73) Assignee: Ciena Corporation, Linthicum, MD (US)

( * ) Notice: Subject to any disclaimer, the term of this patent is extended or adjusted under 35 U.S.C. 154(b) by 874 days.

(21) Appl. No.: 09/969,720

(22) Filed: Oct. 1, 2001

Related U.S. Application Data

(60) Provisional application No. 60/266,092, filed on Feb. 1, 2001.

(51) Int. Cl.
*H04B 10/00* (2006.01)
*H04J 14/02* (2006.01)

(52) U.S. Cl. .......................... 398/162; 398/92; 398/93; 398/94; 398/95; 398/165; 398/166; 398/37; 398/1

(58) Field of Classification Search ................ 398/162, 398/37, 59, 92–95, 165–166, 1
See application file for complete search history.

(56) References Cited

U.S. PATENT DOCUMENTS

| | | | | |
|---|---|---|---|---|
| 4,866,704 A | * | 9/1989 | Bergman | 370/452 |
| 5,764,404 A | * | 6/1998 | Yamane et al. | 359/337.12 |
| 5,933,262 A | * | 8/1999 | Sasagawa | 398/92 |
| 5,986,783 A | * | 11/1999 | Sharma et al. | 398/59 |
| 6,101,013 A | * | 8/2000 | Monacos | 398/1 |
| 6,295,146 B1 | * | 9/2001 | Nathan et al. | 398/50 |
| 6,456,406 B1 | * | 9/2002 | Arecco et al. | 398/59 |
| 6,480,329 B1 | * | 11/2002 | Sugaya et al. | 359/341.42 |
| 6,671,256 B1 | * | 12/2003 | Xiong et al. | 370/230 |
| 2002/0003639 A1 | * | 1/2002 | Arecco et al. | 359/119 |

OTHER PUBLICATIONS

SONET BLSR Equipment Generic Criteria, GR-1230-CORE, Issue 4, Dec. 1998.*

* cited by examiner

*Primary Examiner*—Jason Chan
*Assistant Examiner*—Quan-Zhen Wang
(74) *Attorney, Agent, or Firm*—Dougherty Clements; Christopher L. Bernard; Tyler S. Brown

(57) ABSTRACT

A system for managing signals in an optical network is provided. When a signal is originated by a source node for transmission to a destination node, the source node generates a message. Upon receiving this message, the destination node responds by sending an acknowledgment. Intermediate nodes examine these messages, allowing the nodes to obtain information which is used to take appropriate actions. A node is able to detect a switching event and the output power levels of signals leaving the node are maintained at a predetermined level. When transmission components transmitting a signal are powered up, a sequence of messages is exchanged, allowing the nodes to activate their transmission components in a sequential manner, avoiding signal level interference. Another sequence of messages is exchanged during protection line switching, allowing the nodes to adjust their respective transmission components in a sequential manner so as to avoid a "ringing" effect.

28 Claims, 8 Drawing Sheets

WAVELENGTH MANAGEMENT IN AN OPTICAL NETWORK

CROSS-REFERENCES TO RELATED APPLICATIONS

The present application claims the benefit of priority under 35 U.S.C. § 119 from the provisional patent application, U.S. Patent Application Ser. No. 60/266,092, filed on Feb. 1, 2001, the disclosure of which is hereby incorporated by reference as if set forth in full in this document for all purposes.

The present application is also related to U.S. patent application Ser. No. 09/653,628 entitled "OPTICAL POWER MANAGEMENT IN AN OPTICAL NETWORK," filed on Sep. 1, 2000 and owned by the assignee of the present application, the disclosure of which is hereby incorporated by reference as if set forth in full in this document for all purposes.

BACKGROUND OF THE INVENTION

The present invention generally relates to operation of optical networks, and more particularly, to wavelength management in an optical network.

One issue often associated with the operation of an optical network is the problem of wavelength management. For example, in a wavelength division multiplex (WDM) network, each optical fiber typically is capable of carrying multiple optical signals or channels. Each optical signal is associated with a different wavelength of light. Hence, within an optical fiber, various wavelengths corresponding to different optical signals are present.

During a switching event, some optical signals may be re-routed through the network over different optical fibers in order to reach their respective ultimate destinations. As a result, the number of optical signals or corresponding wavelengths within an optical fiber often varies. Some optical fibers may carry more or fewer signals than anticipated. Therefore, it would be desirable to provide a method and system which allows an optical network to manage optical signals and their corresponding wavelengths more efficiently.

Furthermore, a change in the number of optical signals within an optical fiber often also results in a change in the signal power levels. The resulting signal power levels on an optical fiber may render some signals or corresponding wavelengths unusable or may cause problems in the transmission of those signals and/or in operation of the network. For example, a given signal may be over-amplified or under-amplified when the signal power levels are being adjusted due to a change in the number of optical signals in the optical fiber. Therefore, it would be desirable to provide a method and system which allows an optical network to adjust power levels and transmit signals reliably when the signal power levels within an optical fiber vary.

SUMMARY OF THE INVENTION

The present invention relates to a system and method for managing optical signals or wavelengths in an optical network having a number of nodes. According to one aspect of the present invention, when an optical signal is originated by a source node for transmission to a destination node, the source node concurrently generates a message which is also to be transmitted to the destination node. Upon receiving the message from the source node, the destination node responds by generating an acknowledgment message and sending such acknowledgment message back to the source node.

According to a second aspect of the present invention, the intermediate nodes which pass the messages exchanged between the source node and the destination node also examine such messages, thereby allowing such intermediate nodes to obtain node and network information which can be used by such intermediate nodes to take appropriate actions.

According to another aspect of the present invention, by using the information obtained from the messages, a node is able to determine the received signal power levels coming into the node and accordingly maintain the output signal power levels of optical signals leaving that node at a desired level in a feedback manner. More specifically, the node is able to ascertain the number of optical signals coming into that node and determined the received input signal power levels. Based on the received input signal power levels, a transmission component associated with the node is then adjusted to maintain the output signal power levels of optical signals leaving that node at a desired level.

According to yet another aspect of the present invention, by using the information obtained from the messages, the node is also able to detect a switching event, such as a network failure, and causes the output signal power levels of optical signals leaving that node to be maintained at a predetermined level.

According to a further aspect of the present invention, when transmission components to be used for transmitting an optical signal are initially powered up, a predetermined sequence of messages are exchanged between a source node and a destination node. This sequence of messages allows the source node, the destination node and any intermediate nodes to activate their respective transmission components in a sequential manner so as to avoid signal level interference amongst the transmission components.

According to another aspect of the present invention, another predetermined sequence of messages are exchanged between a source node and a destination node during protection line switching. This sequence of messages allows the source node, the destination node and any intermediate nodes to adjust their respective transmission components in a sequential manner so as to avoid the "ringing" effect.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings. In the drawings, like reference numbers indicate identical or functionally similar elements.

DETAILED DESCRIPTION OF THE INVENTION

Figure 1:
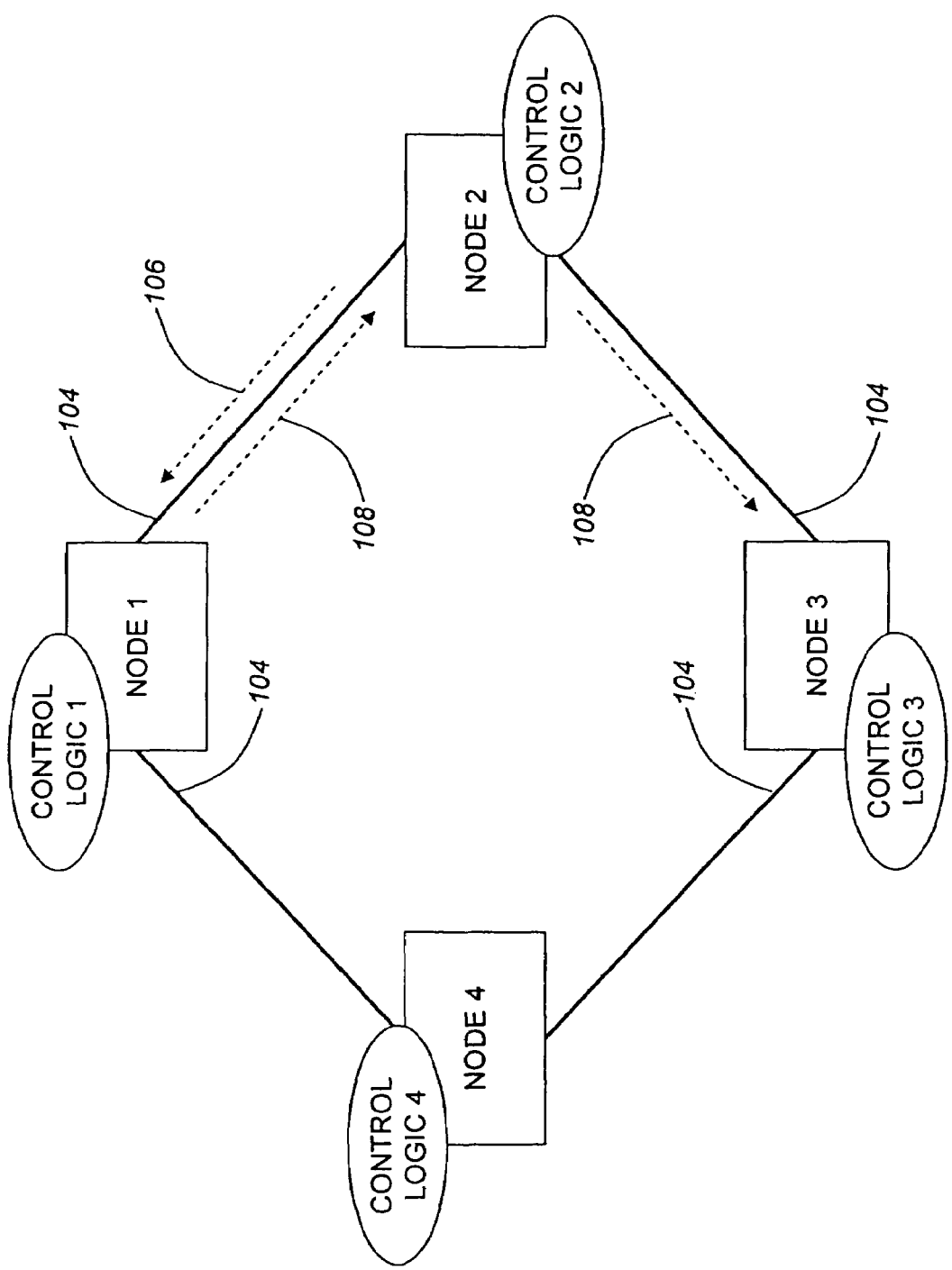
FIG. 1 is a simplified schematic diagram showing a portion of an optical network that depicts the routing of optical signals between nodes.

The present invention in the form of various exemplary embodiments will now be described. FIG. 1 is a simplified diagram illustrating a portion of a typical optical network that includes nodes 1–4 interconnected by optical fibers 104. The nodes 1–4 operate to receive and transmit optical signals around the optical network. Each optical fiber 104 is capable of carrying multiple optical signals (which are represented by corresponding wavelengths). In the typical optical network, the multiple optical signals may represent either working or protection traffic. The concept of working and protection traffic is commonly understood in the field of fiber optic communications. In addition, each optical fiber 104 is also capable of carrying bidirectional traffic, i.e., optical signals can be exchanged between two nodes in both directions.

Referring to FIG. 1, in this example, node 2 transmits optical signal 106 to node 1, node 1 transmits optical signal 108 to node 2, and node 2 then relays optical signal 108 on to node 3. Thus, the nodes 1–4 generally operate to transmit optical signals around the optical network from node to node until the optical signals reach their respective final destinations. It should be understood that the optical network typically includes a number of additional elements which are not shown in FIG. 1. For example, control or communication logic is usually installed at each node so as to allow the nodes to communicate with a network administrator and with one another.

Figure 2:
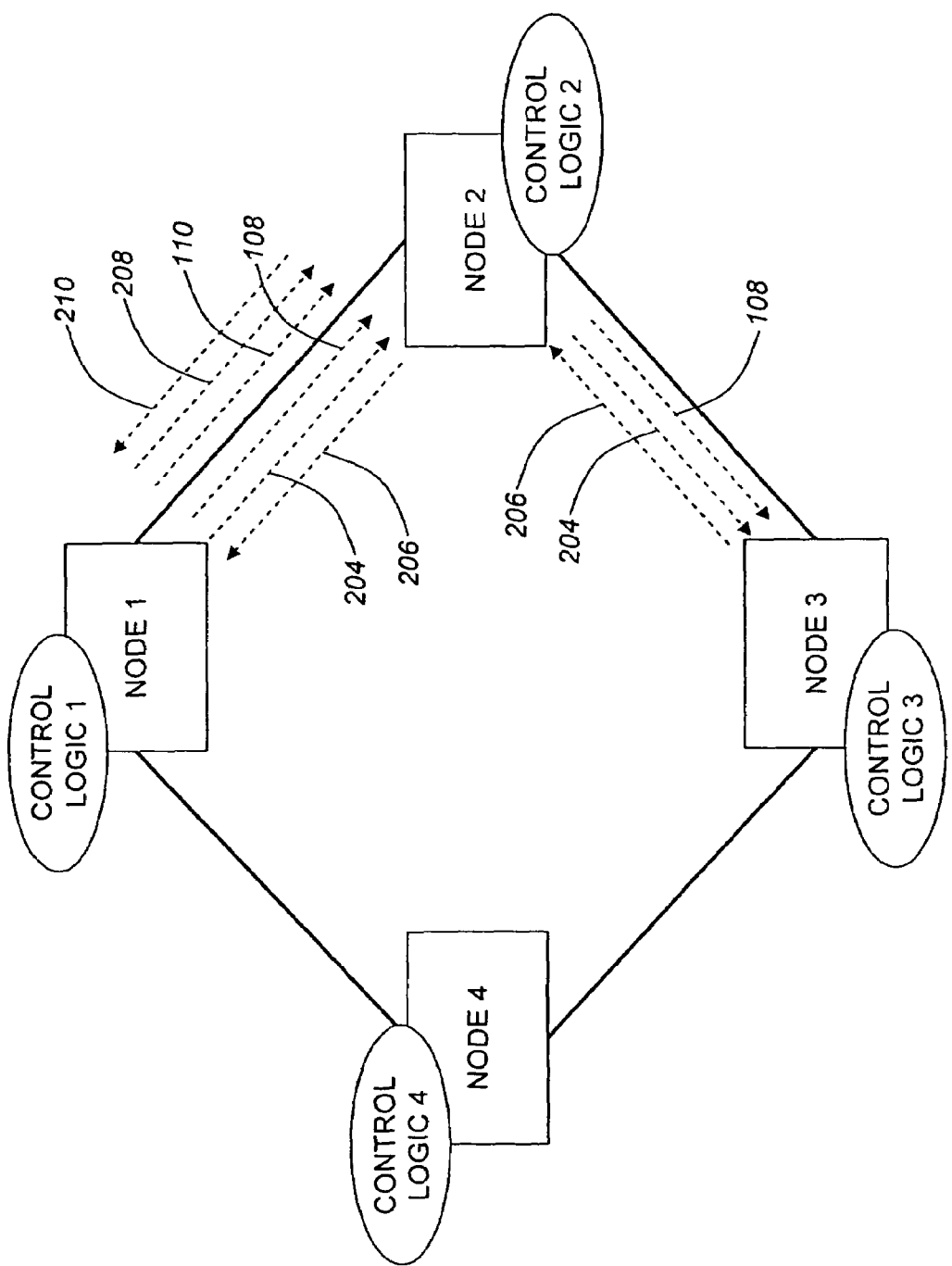
FIG. 2 is a simplified schematic diagram illustrating routing of optical signals and messages in accordance with one embodiment of the present invention.

FIG. 2 illustrates routing of optical signals and messages in an optical network according to one exemplary embodiment of the present invention. Generally, according to this exemplary embodiment, whenever an optical signal is originated from a source node for transmission to a destination node, an associated message is also originated and delivered to the destination. Upon receipt of the associated message, the destination node issues an acknowledgment message which is propagated back to the source. Both the associated message and the acknowledgment message are monitored by intermediate nodes (i.e., nodes which are traversed by the messages going from the source node to the destination node), if any. As will be further described below, by monitoring these messages, the optical network can more efficiently manage the transmission of optical signals (or corresponding wavelengths) amongst its various nodes.

Referring to FIG. 2, according to this exemplary embodiment, the optical signal 108 originated by node 1 is transmitted to node 3 via node 2. Concurrent with origination of the optical signal 108, a message 204 is also created by node 1 and transmitted to node 3. Upon receipt of the message 204 by node 3, a message 206 is generated and propagated back to node 1 as acknowledgment. By routing optical signals and messages in this manner, the optical network is better equipped to more efficiently manage the transmissions of optical signals (or their corresponding wavelengths) amongst its various nodes. A more detailed description of this exemplary embodiment will be provided below.

In one exemplary embodiment, the routing of the optical signals and messages is controlled by a wavelength manager associated with each node. The wavelength manager includes control logic which is used to perform various functions described herein. Preferably, the wavelength manager resides, either in a modular or integrated manner, with other control logic which performs other node and network functions.

Furthermore, the wavelength manager is preferably implemented using software. Software implementation may be done using various computer programming languages and designed in a modular or integrated manner. However, it should be understood that the wavelength manager may also be implemented using hardware or a combination of hardware and software. Based on disclosure provided herein, a person of ordinary skill in the art should know of other ways and/or methods to implement the wavelength manager.

One of the main functions of the wavelength manager is to monitor optical signals or their corresponding wavelengths leaving or entering an associated node. This monitoring is done so as to ascertain what optical signals or wavelengths are currently transmitted over the optical fibers connected to the associated node. The wavelength manager also generates messages for an associated node. In one instance, when an optical signal is originated from a source node, the wavelength manager associated with the source node concurrently causes a message to be generated. The generated message is related to the originated optical signal or its corresponding wavelength. In another instance, when an optical signal originated from the source node is received by a destination node, the wavelength manager associated with the destination node causes a message to be generated and transmitted back to the source node. A message generated by the wavelength manager generally includes two types of information, namely, transmit and receive information. The content of a message will be more fully described below.

In addition, the wavelength manager receives messages coming into the associated node, examines such messages and takes appropriate actions, such as passing a message to a neighboring node, if necessary. By examining messages coming into a node, the wavelength manager is able to ascertain the status of the network and its nodes, thereby allowing the wavelength manager to more efficiently handle optical signals coming into or leaving that node, as will be further explained below.

Moreover, the wavelength manager maintains configuration and routing information relating to optical signals entering and leaving an associated node. At each node, such configuration and routing information is used to determine what course of action is to be taken with respect to optical signals (or corresponding wavelengths) handled by the node. A course of action may include, for example, terminating (or dropping) a particular wavelength or passing a particular wavelength to a neighboring node.

The configuration and routing information may be changed or updated based on information received from a network administrator. Such configuration and routing information is typically stored in a configuration table associated with each node. For example, referring to FIG. 2, the wavelength manager associated with node 2 uses the configuration and routing information to route the optical signals received from node 1 accordingly. More specifically, the optical signal 108 is received from node 1 and passed on to node 3; and the optical signal 110 is received from node 1 and is terminated at node 2. As will be more fully described below, by utilizing and monitoring messages and maintaining configuration and routing information at each node, optical signals or their corresponding wavelengths that are being transmitted on the optical network can be managed more efficiently.

As mentioned above, a source node that originates an optical signal also generates a message which follows the optical signal to its destination node. Referring to FIG. 2, the optical signal 108 is originated and transmitted from node 1 to node 3 via node 2. Concurrent with origination of the optical signal 108, node 1 (via its wavelength manager) also generates and sends a message 204 to node 3 via node 2. In response to receipt of the message 204, node 3 generates a message 206 and sends it back to node 1 as acknowledgment.

The message 204 may be routed from node 1 to node 3 in a number of ways. In one embodiment, the message 204 follows the optical signal 108 over a working network path. In another embodiment, when a switching event occurs and the optical signal 108 is transmitted over a protection path, the message 204 follows the optical signal 108 over the protection path. It should be noted that in the foregoing situations in which the message 204 follows the same transmission path as the optical signal 108, the message 204 may travel "out-of-band", i.e., the message 204 is separate from the optical signal 108. In yet another embodiment, the message 204 is sent over an optical supervisory channel (OSC) or a third party network or communication channel which is external to the network to nodes on the network. Such third party network or communication channel may include, for example, a separate optical path, an electronic path, a wireless path, or any other type of communication path that may be used to reach any or all of the nodes on the network. It should be understood that depending on the route which is taken for a message to arrive at the destination node, the message and the associated optical signal may or may not arrive at the destination node at the same time. Likewise, the message 206 may also be routed from node 3 to node 1 in various manners as described above.

A message generated concurrently with an optical signal and a message generated in response to receipt of a message by a destination node each includes two types of information, namely, transmit and receive information. Transmit information includes information relating to the optical signal transmitted by the node, such as transmission component identification and status information (e.g., information indicating identity of transmission component associated with the node and used to transmit the optical signal (or its corresponding wavelength) and information indicating status of the transmission component such as on/off/enable), signal identification information (e.g., information identifying the optical signal (or its corresponding wavelength) associated with the message) and source/destination information (e.g., information identifying the source and destination of the message).

Receive information includes information relating to optical signals (or their corresponding wavelengths) received by the node which issues the message, such as, status information indicating what and/or whether optical signals are successfully received at the node. This receive information serves an acknowledgment indicating that optical signals are successfully received by the node. By examining the contents of messages coming into a node, the node (via its wavelength manager) is able to obtain information on optical signals coming into that node as well as information on other nodes. Using information obtained from these incoming messages, the node is consequently able to take appropriate actions.

Referring back to FIG. 2 to further illustrate the operation of the exemplary embodiment described herein, the optical signal 108 and its associated message 204 are transmitted from node 1 to node 3 via node 2. Upon receipt of the message 204 by node 3, the message 206 is generated and propagated back to node 1. The message 204 includes transmit information identifying the transmission component associated with node 1 that is used to transmit the optical signal 108 from node 1 and indicating whether such transmission component is functioning properly. The transmit information also includes information linking the message 204 with the optical signal 108 and identifying the source and destination of the message 204. The message 204 also includes receive information identifying optical signals (not shown) which are transmitted to node 1 and successfully received.

Similarly, the message 206 includes transmit information identifying the transmission component associated with node 3 and available to be used to transmit an optical signal (which is a counterpart of the optical signal 108) from node 3 and indicating whether such transmission component is functioning properly. The transmit information also includes information linking the message 206 with the optical signal 108 and identifying the source and destination of the message 206. The message 206 also includes receive information identifying optical signals which are transmitted to node 3 and successfully received.

When node 1 receives the message 206, node 1 verifies from this message 206 that the optical signal 108 it transmitted to node 3 has been successfully received at node 3. Since the message 206 is generated in response to receipt of the message 204 by node 3 and is independent of the receipt of the optical signal 108, the receive information contained in the message 206 can be checked to determine whether the optical signal 108 has been successfully received by node 3. For example, if the optical signal 108 is not successfully received by node 3, examination of the receive information contained in the message 206 would reveal that optical signal 108 is not amongst the optical signals which have been successfully received by node 3. As a result, it is possible for node 1 to determine if any network failures have prevented the optical signal 108 as well as other optical signals originating from node 1 from reaching node 3.

Furthermore, it is possible for all intermediate nodes (i.e., all other nodes which are traversed by the optical signal in addition to the source node and the destination node) to monitor the exchanged messages to determine whether signal transmissions have been successful. In the example provided in FIG. 2, node 2 is able to monitor the message 204 from node 1 and the message 206 from node 3 to determine whether the optical signal 108 has successfully reached its destination. In addition, node 2 is able to determine which optical signals are successfully received by both nodes 1 and 3. Moreover, by examining the messages 204 and 206 exchanged between node 1 and node 3, node 2 is also able to determine the number of optical signals entering into node 2. As will be described further below, information on the number of optical signals coming into a node can be used to maintain appropriate output signal power levels for that node.

More specifically, by examining the contents of the message 204, node 2 is able to determine from the transmit information that the transmission component associated with node 1 and used to transmit the optical signal 108 is functioning properly. By examining the transmit information, node 2 is also able to determine the identity of the optical signal 108 (or its corresponding wavelength) and then uses the configuration and routing information to properly pass the optical signal 108 and the message 204 to the destination node which, in this case, is node 3.

Node 2 is further able to determine from the receive information the optical signals which are successfully received by node 1. By having this information available, node 2 is then better equipped to more efficiently transmit any optical signals to node 1. For example, if it is determined that certain optical signals are not received by node 1, then node 2 may suspend transmission of these optical signals intended for transmission to node 1 to avoid wasting resources on unsuccessful transmissions. Likewise, the receive information contained in the message 206 can be used by node 2 for similar purposes to determine whether optical signals should be transmitted to node 3.

Figure 3:
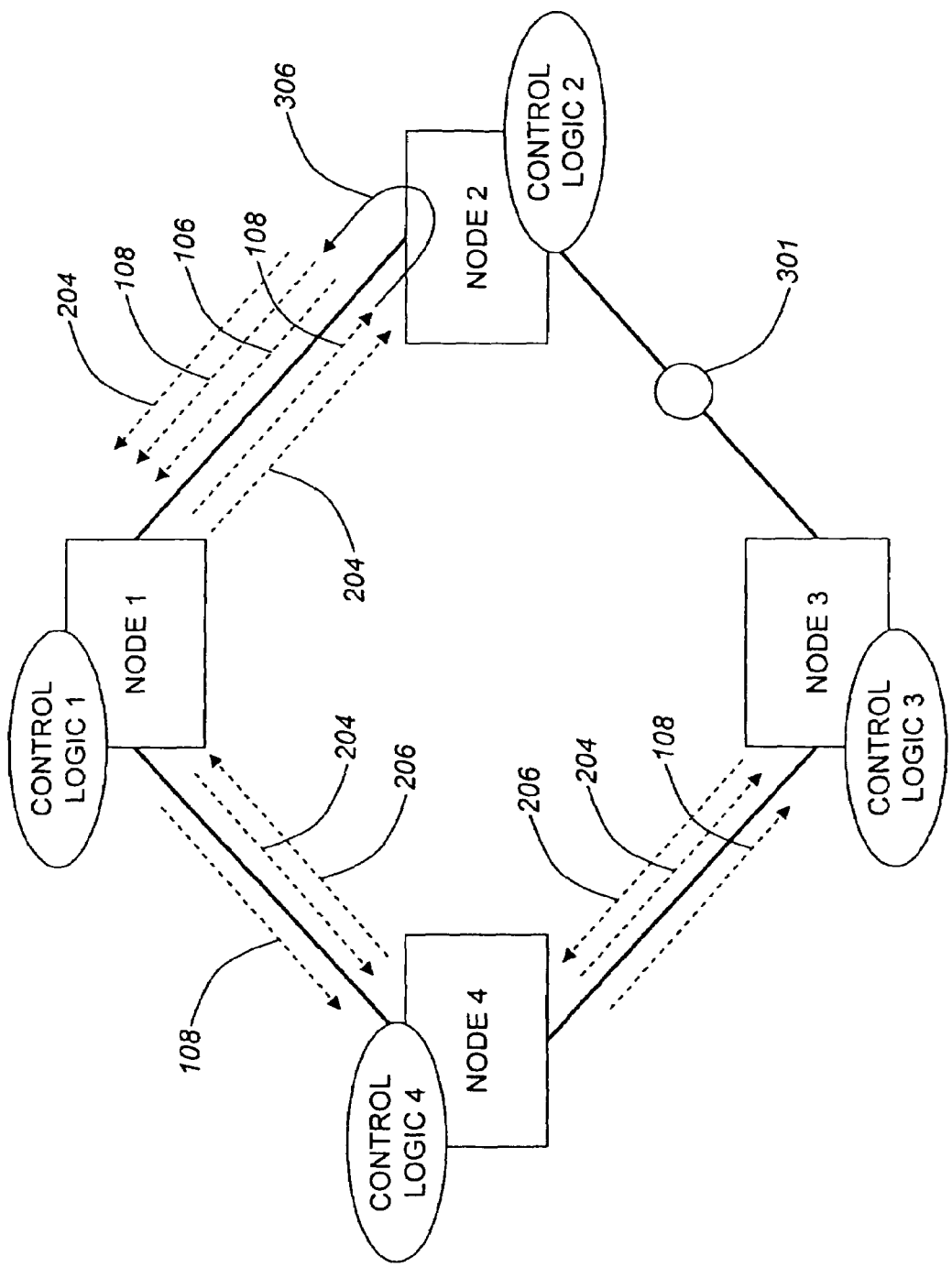
FIG. 3 is a simplified schematic diagram illustrating routing of optical signals and messages as a result of a network failure in accordance with one embodiment of the present invention.

FIG. 3 illustrates how an optical signal is re-routed as a result of a network failure in accordance with one exemplary embodiment of the present invention. The following discussion assumes there is a network failure at point 301 that may be caused, for example, by a cut in the optical fiber that prevents node 2 from transmitting the optical signal 108 directly to node 3. In this case, node 2 operates to re-route the optical signal 108 to reach its final destination at node 3. More specifically, the optical signal 108 is re-routed at node 2, as shown at 306, and transmitted back to node 1. When the optical signal 108 reaches node 1, it is transmitted to node 4. From node 4, the optical signal 108 is then transmitted to its final destination at node 3. Thus, re-routing overcomes the network failure at 301, and allows the optical signal 108 to reach its destination at node 3. Included with the re-routing of the optical signal 108 is the re-routing of the associated messages 204 and 206 as described with reference to FIG. 2. In one embodiment, as a result of re-routing, the messages 204 and 206 follow the same path through the network as the re-routed optical signal 108, and any intermediate nodes monitor these messages 204 and 206 to determine if the optical signal 108 was successfully received at its destination node 3. Alternatively, the messages 204 and 206 are transmitted via the OSC. In another embodiment, the messages 204 and 206 are delivered through another available signal path.

When optical signals are re-routed amongst nodes on a network, the number of optical signals being carried on an optical fiber is subject to change. In turn, this change in number of optical signals affects the power levels of the optical signals being carried on the associated optical fiber. Referring to FIG. 3, for example, prior to switching, node 2 transmits the optical signal 106 to node 1 at a selected power level. As a result of the re-routing of the optical signal 108, node 2 now transmits both optical signals 106 and 108 to node 1. Thus, the number of optical signals being carried on the optical fiber connecting nodes 1 and 2 has increased. This increase in number of optical signals accordingly affects the power levels of the optical signals being carried on that optical fiber.

Typically, attempts are made to maintain the power levels of the optical signals at a constant level. For example, optical signals transmitted from node 2 may be gain adjusted so as to maintain a constant power level for all optical signals transmitted from node 2. This may render one or more of the optical signals transmitted on the optical fiber unusable, since the gains may have been adjusted to an unusable level. As will be further described below, the present invention provides a system and method which seeks to maintain a constant power level for optical signals when there is a change in the number of optical signals being carried on an optical fiber without rendering one or more of the optical signals unusable.

At each node, a power manager is employed to determine a number power parameters including, for example, the appropriate constant power level for optical signals transmitted from the node. An exemplary embodiment of the power manager is disclosed in U.S. patent application Ser. No. 09/653,628 entitled "OPTICAL POWER MANAGEMENT IN AN OPTICAL NETWORK," filed on Sep. 1, 2000 and owned by the assignee of the present application, the disclosure of which is hereby incorporated by reference as if set forth in full in this document for all purposes.

In order to maintain the determined constant power level for optical signals transmitted from each node, the total power coming into the node is calculated and then adjusted so that the power levels for optical signals leaving the node is maintained at the determined constant power level. The total power can be calculated based on the number of optical signals entering the node. The number of optical signals entering the node, in turn, can be determined by examining messages coming into the node, as described above.

Figure 4:
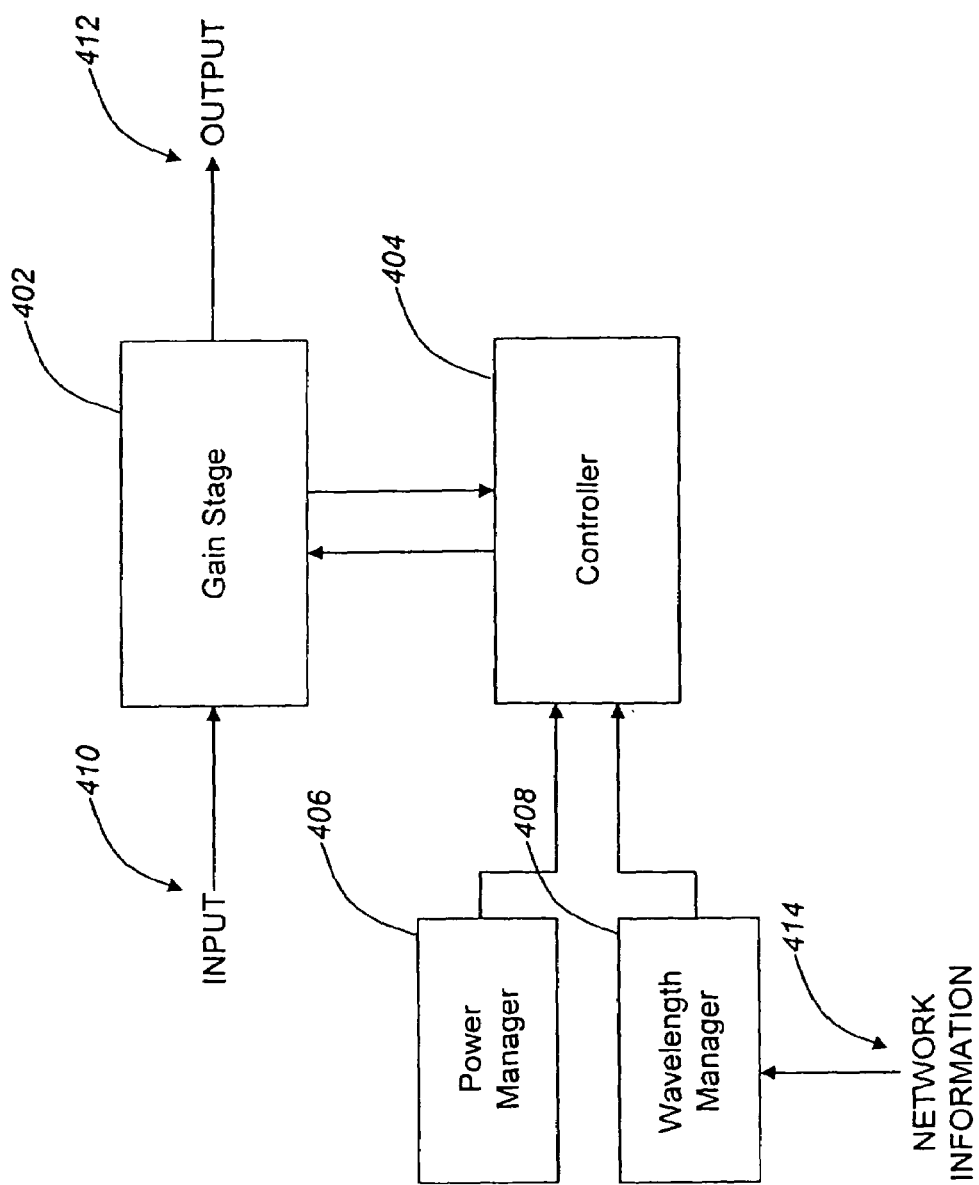
FIG. 4 is a simplified functional block diagram illustrating an exemplary transmission component used in a node for maintaining the output power levels of optical signals leaving a node in accordance with the present invention.

FIG. 4 illustrates an exemplary transmission component used in a node for maintaining the output power levels of optical signals leaving a node. This exemplary transmission component includes a gain stage 402, a controller 404, a power manager 406 and a wavelength manager 408. The power manager 406 and the wavelength manager 408 are similar to the ones described above. It should be understood that the transmission component does not have to have all the elements described above. For example, the power manager 406 and the wavelength manager 408 can be separate from the transmission component.

During exemplary operation of the transmission component, optical signals coming into the node are received via an input signal channel 410. The received signals are coupled to the gain stage 402 or an adjustable signal transmitter for re-transmission on the optical network via a transmit signal channel 412. The controller 404 is coupled to the gain stage 402 so that signal power input to and transmitted from the gain stage 402 can be measured and controlled.

The power manager 406, as mentioned above, calculates a number of power parameters, such as, the appropriate constant power level for optical signals, or power per wavelength, to be transmitted from the node. These power parameters are provided to the controller 404 to allow the controller 404 to accordingly adjust the gain stage 402 so as to maintain a desired level of output signal power at the transmit signal channel 412.

The wavelength manager 408 receives various network information via an information channel 414. The various network information includes, for example, number of optical signals or wavelengths being received at a node. The network information received at the information channel 414 represents information received from a variety of sources. For example, the network information may include information received via an optical supervisory channel (OSC) that is used to communicate various network parameters to the nodes. The information may also be derived from monitoring messages sent by source and destination nodes as described above. Thus, it is possible for the wavelength manager 408 to receive various network information to allow the selected node to adjust its operating parameters. In one embodiment, the network information may be stored at each node to allow such node to adjust its operating parameters by determining specific network activity and referencing the stored network information to determine the operating parameters to be used. The network information received by the wavelength manager 408 is also provided to the controller 404.

Using information provided by the power manager 406 (e.g., power per wavelength) and the wavelength manager 408 (e.g., number of wavelengths) and information relating to the received signals (e.g., total power coming into the node), the controller 404 is then able to adjust the gain stage 402 in a feedback manner to maintain a desired level of output signal power at the transmit signal channel 412. This is referred to as "closed loop" operation, wherein the gain stage 402 is constantly monitored and adjusted to produce a signal for transmission that has a selected power level.

Figure 5:
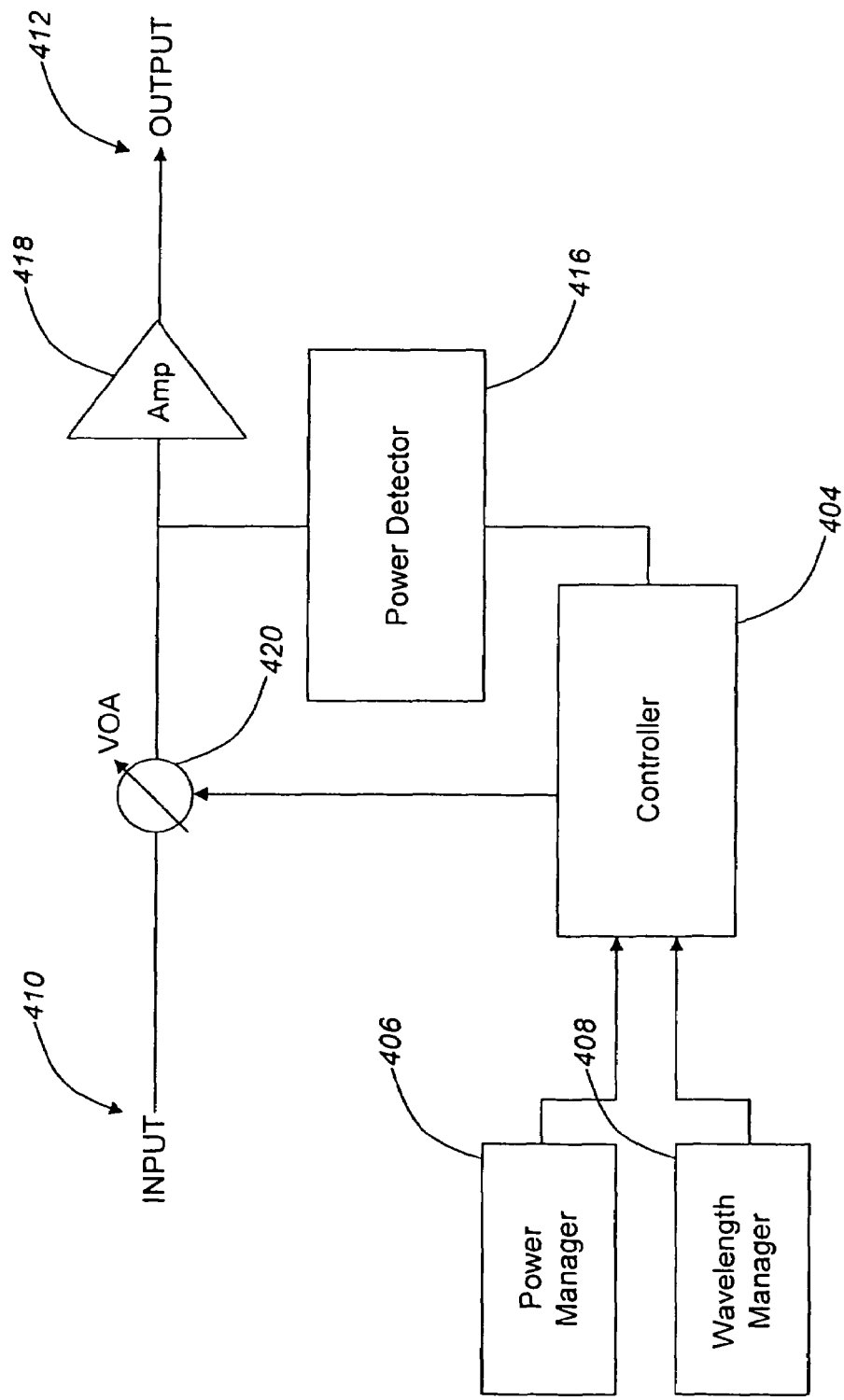
FIG. 5 is a simplified functional block diagram illustrating another exemplary transmission component used in a node for maintaining the output power levels of optical signals leaving a node in accordance with the present invention.

The gain stage 402 can be adjusted in a number of ways to maintain the desired level of output signal power at the transmit signal channel 412. FIG. 5 shows one exemplary embodiment of the gain stage 402 according to the present invention. The gain stage 402 includes a variable optical attenuator 420, a power detector 416 and an amplifier 418. The received signals are coupled to the variable optical attenuator 420 which in turn outputs these signals to the power detector 416 and the amplifier 418. The "closed loop" operation is performed by the controller 404 as follows. Upon receiving the output from the variable optical attenuator 420, the power detector 416 is able to derive information relating to the total power coming into the node and relay such information to the controller 404. Using this information and the information provided by the power manager 406 and the wavelength manager 408 as described above, the controller 404 then directs the variable optical attenuator 420 to either attenuate or amplify the received signals thereby allowing a desired level of output signal power to be maintained at the transmit signal channel 412.

In another embodiment, the gain stage 402 can be adjusted to maintain a desired level of output signal power by manipulating a gain level. The gain level is applied to the received signals to produce the output signals at the transmit signal channel 412. For example, a variable gain amplifier with an adjustable gain level can be used. Hence, by adjusting the gain level, the desired level of output signal power can also be achieved. Similarly, information provided by the power manager 406 and the wavelength manager 408 is used by the controller 404 to set the gain level of the gain stage 402 so that the signal power on the transmit signal channel 412 can be controlled. The controller 404 monitors the output signal power at the output of the gain stage 402, i.e., the transmit signal channel 412 and adjusts the gain level of the gain stage 402 accordingly to achieve the desired output power level. Thus, the controller 404 operates to form a feedback loop to adjust the gain stage 402 to achieve selected signal power level at the transmit signal channel 412.

According to one embodiment of the present invention, the nodes adjust their respective transmission components when a switching event occurs. A switching event may include, for example, a network failure, change in optical signal power levels, and other events triggered by predetermined network conditions. For example, if an optical fiber fails and optical signals are re-routed (i.e., as described with reference to FIGS. 2–3), the nodes react to this failure by adjusting their respective transmission components so that all optical signals transmitted from the transmission components are maintained at selected power levels. This allows the network to be placed in a predetermined state until optical signal re-routing is completed, thereby maintaining signal power levels within network operating limits.

A node may detect a switching event on its own or it may obtain knowledge of the occurrence of a switching event via other sources. For example, indications of a switching event may be provided to a node via an OSC channel instruction. Thus, it is possible for a supervisory system to monitor the network and alert the nodes to an occurrence of a switching event without having the nodes detect the switching event itself. For instance, if the network is aware that certain optical signals are to be re-routed, information relating to re-routing of the optical signals can be delivered in advance to the nodes thereby allowing the nodes to take appropriate actions without requiring the nodes to first detect the change in received signal power themselves. This type of alert system can also be used to alert nodes of other network conditions that may require the nodes to change loop operating conditions to maintain signal integrity. Such network conditions may include, for example, the addition of new optical signals to the network, the removal of optical signals from the network, or the addition or removal of network hardware, which may require one or more nodes to change their loop operating conditions to maintain signal integrity.

According to one embodiment of the present invention, when a switching event representing a network failure which results in an optical signal not getting received at its destination node occurs, the transmission component at a node which detects the switching event on its own or via some other source goes into what is referred to as "open loop" operation. As described above, when an optical signal is not received at its destination node, the message generated by the destination node which is propagated back to the source node can be used to inform the source node that the optical signal is not received. A node examining the messages sent between the source node and the destination node is then able to determine that there is a discrepancy between the number of optical signals sent from the source node and the number of optical signals received by the destination node, thereby indicating that the network fails to properly transmit at least one of the optical signals from the source node to the destination node. The node examining the messages, however, is unable to determine the exact location of the network failure. Since the node is unable to make that determination, the transmission component associated with the node is caused to go into "open loop" operation, which will be further described below. This is performed because the node can no longer verify the accurate number of optical signals coming into that node. Since the number of optical signals cannot be ascertained, "closed loop" operation cannot be carried out properly. For example, as will be further described below, if the wrong number of optical signals are provided to the transmission component and "closed loop" operation is forced to be carried out, the power parameters provided by the power manager will be miscalculated and consequently the output signal power levels will either be too much or too little. Hence, it would be a waste of resources to continue "closed loop" operation to cause the transmission component to maintain a constant power level for the transmit signal channel 412 when the number of optical signals coming into a node can no longer be ascertained. Alternatively, the transmission component of the node may go into "open loop" operation upon receiving notification from a network administrator that a switching event in the form of a network failure has occurred.

In "open loop" operation, the gain stage 402 is not continually adjusted to maintain a constant power level at the transmit signal channel 412 as contrasted with "closed loop" operation. Instead, the gain stage 402 is set to a selected level that is then applied to all signals input to the gain stage 402. For example, in the exemplary embodiment which includes the variable optical attenuator 420, the variable optical attenuator 420 is maintained at the selected level during "open loop" operation; and in the other exemplary embodiment which includes the variable gain amplifier, the gain level of the variable gain amplifier is also maintained at the selected level during "open loop" operation. Thus, the signal output of the gain stage 402 or the transmit signal channel 412 during "open loop" operation may have a power level that is dependent on the power levels of the signals input to the gain stage 402. The level selected for the gain stage 402 during "open loop" operation can be determined in a number of ways. For example, the selected level may be the level of the gain stage 402 achieved during "closed loop" operation immediately before "open loop" operation is engaged. Alternatively, the selected level may be an estimated level provided by the power manager.

According to another embodiment of the present invention, a switching event representing a change in received signal power levels may also cause the transmission component of a node to go into "open loop" operation. Such a change may occur when additional optical signals are added to an optical fiber for transmission, due to for example re-routing caused by a network failure or addition of new optical signals. The addition of optical signals increases the received signal power levels at an associated node. Hence, such a change may be relied upon as indication of the occurrence of a switching event. As described above, if there is a switching event, the transmission component is caused to engage in "open loop" operation to avoid incorrect execution of "closed loop" operation.

To avoid erroneous triggering the transmission component to go into extended "open loop" operation due to false switching events, such as, transient power glitches or surges, the received signal power levels are aged to prevent such false switching events from being interpreted as actual switching events. More specifically, when the transmission component detects an unacceptable change in received signal power levels, the transmission component goes into and remains in "open loop" operation for an arbitrary period of time, for example, a two-minute period. Upon expiration of the arbitrary period, the transmission component again checks the received signal power levels to determine whether such levels remain unacceptable. If the received signal power levels return to acceptable levels, then the transmission component returns to "closed loop" operation. Thus, changes to the received signal power levels which persist after expiration of the arbitrary period can be more reliably determined to be caused by a legitimate switching event.

The choices with respect to unacceptable change in received signal power levels and duration of the arbitrary period are made based on system requirements and/or other factors. Thus, for example, what constitutes an unacceptable change in received signal power levels and the duration of the arbitrary period are not selected to be so narrow as to render detection of false switching events ineffective. It should be apparent to a person of ordinary skill in the art how appropriate values are to be chosen to render detection of false switching events more reliable.

According to another embodiment of the present invention, the nodes in the network activate their respective transmission components in a specific manner to be more fully described below when the transmission components are initially powered up. This is done to ensure that all the transmission components will be operating correctly. The reason for activating the transmission components in a specific manner is twofold. First, for a source node, when the associated transmission component is initially powered up to transmit an optical signal, the destination node and all the intermediate nodes, if any, have no knowledge of the impending transmission of the optical signal. Hence, without any information, the transmission components associated with these nodes will not be able to operate properly to calculate and maintain the appropriate constant output signal power levels.

Furthermore, as the transmission components are initially turned on, these transmission components may not achieve full power immediately. Depending on the operating characteristics of the transmission components, different transmission components may reach full power differently causing variations in output signal power levels. These variations in output signal power levels may affect downstream nodes if "closed loop" operation is carried out simultaneously while these variations are occurring.

The present invention overcomes the foregoing problems by providing a system for enabling the transmission components after downstream nodes have been notified, and therefore, allowing the downstream nodes to prepare for the effects of the initial power-up of the transmission components.

Figure 6:
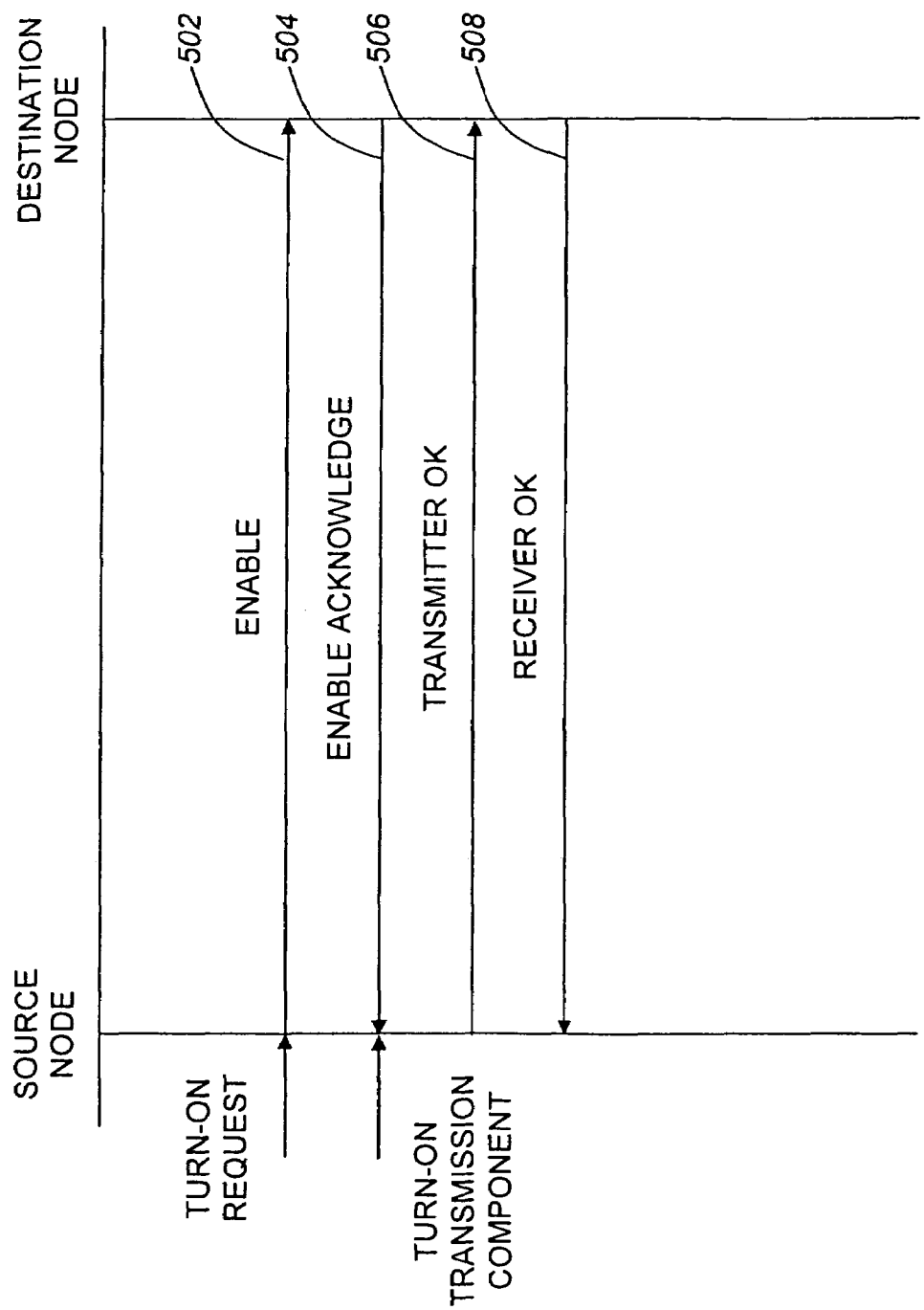
FIG. 6 is a simplified diagram illustrating an exemplary sequence of messages exchanged between a source node and a destination node in an optical network in accordance with an embodiment of the present invention.

FIG. 6 shows an exemplary sequence of messages exchanged between a source node and a destination node according to an exemplary embodiment of the present invention. More specifically, this sequence of messages are exchanged between the source node and the destination node to achieve power-on of the transmission component associated with the source node in order to transmit an optical signal to the destination node. Referring to FIG. 6, a request is first received by the source node from the network requesting the source node to activate the associated transmission component. Before the transmission component at the source node is activated, the source node sends out an enable request or message 502 to the destination node to request permission to begin activation of the transmission component at the source node. Information relating to the request for permission to begin activation of the transmission component is provided as part of the transmit information within the message 502.

The message 502 passes intermediate nodes, if any, before reaching the destination node. Each intermediate node examines the message 502 and causes its associated transmission component to engage in "open loop" operation before the message 502 is passed to the next intermediate node.

Upon receiving the message 502, the destination node responds by causing its associated transmission component to engage in "open loop" operation. In essence, the transmission components associated with the intermediate nodes and the destination node are respectively caused to engage in "open loop" operation in a sequential order. This allows the nodes the ability to add a new optical signal soon to be originated from the source node without distorting existing optical signal.

After its associated transmission component is caused to engage in "open loop" operation, the destination node then sends an acknowledge message 504 to the source node. The acknowledge message 504 indicates that the destination node is prepared to accept the new optical signal. Information relating to the destination node's acknowledgment to accept the new optical signal is provided as part of the receive information within the message 504.

Upon receiving the acknowledge message 504, the source node activates its associated transmission component and then begins transmitting the new optical signal along with a transmitter OK message 506. The transmitter OK message 506 flows along with the new optical signal to the destination node via the intermediate nodes, if any.

Upon receiving the transmitter OK message 506, the destination node causes its associated transmission component to engage in "closed loop" operation and also responds with a receiver OK message 508 that is sent to the source node to indicate that the newly transmitted optical signal has been received properly.

The receiver OK message 508 propagates through all intermediate nodes on its way back to the source node. As each intermediate node sees the receiver OK message 508, each intermediate node causes its transmission component to engage in "closed loop" operation. Thus, when the receiver OK message 508 reaches the source node, the destination node and all the intermediate nodes have sequentially caused their respective transmission components to engage in "closed loop" operation. The foregoing process can be used for any type of network having a tree structure or a structure where signals flow over predetermined network paths.

Figure 7:
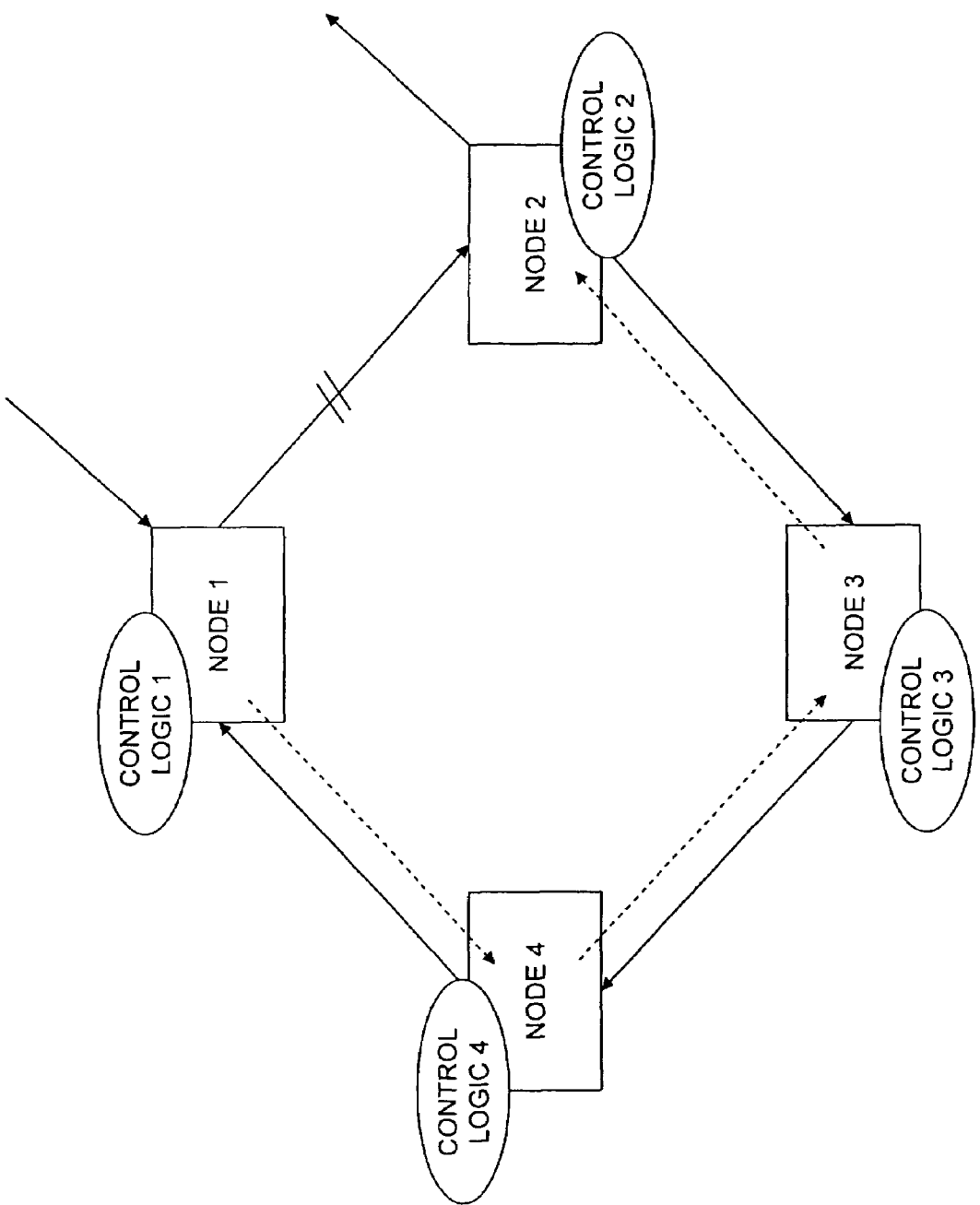
FIG. 7 is a simplified schematic diagram illustrating routing of optical signals during a network failure.

According to another embodiment of the present invention, the nodes adjust their respective transmission components in a particular manner to be described further below during protection line switching to prevent the transmission components from being erroneously identified as operating improperly. FIG. 7 shows a situation in which the optical fiber connecting node 1 and node 2 is cut. As a result, optical signals from node 1 are re-routed via node 4 and node 3 to node 2. Furthermore, the re-routed optical signals are made to travel to node 2 via protection paths.

The foregoing situation typically involves switching optical signals traveling on working and/or protection paths at a number of nodes. As a result, due to switching of the optical signals, there are variations or changes in received signal power levels at these nodes. Since each node exchanges optical signals with its neighboring nodes, changes in received signal power levels at these nodes are exacerbated. The cumulative effect of having changes in received signal power levels at various nodes may result in what is commonly known as a "ringing" effect, wherein the received signal power levels of a transmission component at a node may be caused to exceed a loss-of-signal threshold. When the loss-of-signal threshold is exceeded, an error is considered to have occurred within the transmission component and the transmission component is considered to be no longer able to reliably receive optical signals, thereby erroneously causing the transmission component to be taken out of operation.

According to an exemplary embodiment of the present invention, the "ringing" effect is minimized by adjusting the respective transmission components of the participating nodes in a staggered manner when protection line switching takes place.

Figure 8:
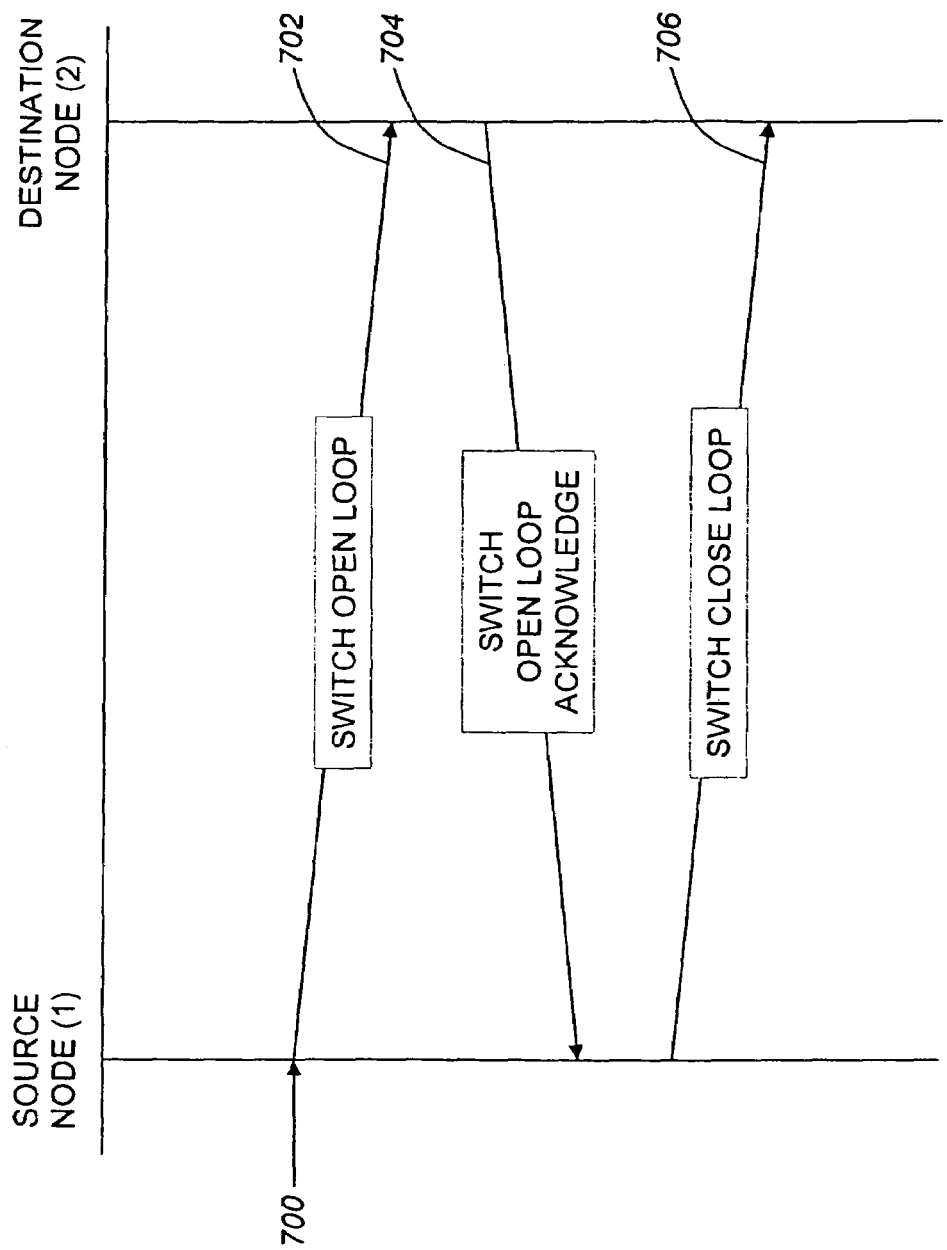
FIG. 8 is a simplified diagram illustrating an exemplary sequence of messages exchanged between a source node and a destination node in an optical network during protection line switching in accordance with an embodiment of the present invention.

FIG. 8 illustrates an exemplary sequence of messages exchanged between a source node and a destination node during protection line switching as shown in FIG. 7. As described above in connection with FIG. 7, optical signals from node 1 are re-routed through nodes 4 and 3 to node 2 via protection paths. Referring to FIG. 8, at point 700, node 1 detects or otherwise receives information on a switching event, which is that optical signals going to node 2 are to be re-routed via nodes 4 and 3 using protection paths. In response, node 1 causes its associated transmission component to go into "open loop" operation. Node 1 then forwards a message 702 to node 2 directing node 2 to cause its associated transmission component to engage in "open loop" operation. The message 702 is passed through and examined by nodes 4 and 3 before reaching node 2.

At each intermediate node, i.e., nodes 3 and 4, upon receiving the message 702, the intermediate node also directs its associated transmission component to go into "open loop" operation. After the associated transmission component engages in "open loop" operation, the intermediate node waits for a predetermined period of time, e.g., 100 ms, before passing the message 702 to the next node.

Upon receiving the message 702, node 2 returns a message 704 to node 1 acknowledging that the transmission component associated with node 2 has been caused to engage in "open loop" operation. Similarly, each intermediate node traversed by the message 704 waits for the predetermined period of time after receipt of the message 704 before passing the message 704 onto the next node.

When the message 704 is received by node 1, node 1 causes its associated transmission component to engage in "closed loop" operation. Node 1 then issues another message 706 and sends it via nodes 4 and 3 to node 2 directing node 2 to cause its associated transmission component to go into "closed loop" operation.

Each intermediate node, i.e., nodes 4 and 3, examines the message 706 and then causes its associated transmission component to go into "closed loop" operation. Likewise, after the associated transmission component engages in "closed loop" operation, the intermediate node waits for a predetermined period of time, e.g., 100 ms, before passing the message 706 to the next node. In essence, by following the above scheme, the transmission component at each node is sequentially caused to engage in "closed loop" operation with at least a predetermined time period or latency in between activation between two nodes. By waiting a predetermined time period before the message 706 is passed on, each node ensures that its associated transmission component is given sufficient time to stabilize thereby avoiding the "ringing" effect.

Finally, upon receiving the message 706, node 2 causes its associated transmission component to engage in "closed loop" operation. At this point, the optical signals can be re-routed properly from node 1 to node 2 via nodes 4 and 3 without suffering any "ringing" effect.

With respect to FIG. 8, while an exemplary sequence of messages is described between a source node and a destination node in one direction going from the source node to the destination node, it should be understood that a similar sequence of messages are also exchanged between the source node and the destination node in the other direction going from the destination node to the source node. This is attributed to the fact that during protection line switching, working and protection traffic between a source node and a destination node travel in opposite directions.

It is understood that the examples and embodiments described herein are for illustrative purposes only and that various modifications, alternative constructions, and equivalents in light thereof will become apparent or be suggested to persons skilled in the art and are to be included within the spirit and purview of this application. Therefore, the above description should not be taken as limiting the scope of the invention as defined by the claims.

What is claimed is:

1. A system for managing optical signals in an optical network having a plurality of nodes, comprising:
    a first node configured to transmit an optical signal to a second node;
    a first control logic associated with the first node and configured to generate a first message associated with the optical signal, wherein the first message is to be transmitted to the second node, and wherein the first message includes information relating to a transmission component associated with the first node that is used to transmit the optical signal and information relating to optical signals received by the first node;
    a second control logic associated with the second node and configured to generate a second message upon receipt of the first message by the second node, wherein the second message is to be transmitted to the first node, and wherein the second message includes information relating to optical signals received by the second node;
    wherein the first and second messages are transmitted between the first and second nodes via a transmission path traversed by the optical signal, and wherein the transmission path includes one or more intermediate nodes and at least one intermediate node examines the first and second messages to ascertain conditions relating to the first and second nodes;
    wherein prior to activating the transmission component associated with the first node to transmit the optical signal, the first node via the first control logic generates and transmits an enable message to the second node requesting permission to activate the transmission component associated with the first node, the enable message is routed via the intermediate nodes, and upon receiving and examining the enable message, each intermediate node causes its associated transmission component to assume a first operational mode;
    wherein upon receiving the enable message, the second node via the second control logic generates and transmits an enable acknowledge message to the first node granting permissions to activate the transmission component associated with the first node;
    wherein upon receiving the enable acknowledge message, the first node via the first control logic generates and transmits a transmitter OK message to the second node indicating that the transmission component associated with the first node has been activated and is operational:
    wherein upon receiving the transmitter OK message, the second node via the second control logic generates and transmits a receiving OK message to the first node indicating that transmission component associated with the second node has been activated and is ready to receive the optical signal:
    wherein the receiver OK message is routed via the intermediate nodes; and
    wherein upon receiving and examining the receiver OK message, each intermediate node causes its associated transmission component to assume a second operational mode.

2. The system according to claim 1 wherein by examining the first and second messages, each of the intermediate nodes is able to determine whether the optical signal is successfully transmitted from the first node to the second node.

3. The system according to claim 1 wherein the first and second messages are transmitted between the first and second nodes via an optical supervisory channel.

4. The system according to claim 1 further comprising:
    a third control logic associated with the at least one intermediate node and configured to calculate a selected level to be used to maintain a desired output signal power level for optical signals to be transmitted from the at least one intermediate node;
    wherein by examining the first and the second messages, the at least one intermediate node is able to determine received input signal power levels coming into that node; and
    wherein the third control logic is further configured to adjust the selected level in response to the received input signal power levels so as to maintain the desired output signal power level.

5. The system according to claim 4 wherein upon detecting a switching event, the third control logic causes the selected level to assume a predetermined level without regard to the received input signal power levels.

6. The system according to claim 1 wherein:
    the first operational mode relates to open-loop operation; and
    the second operational mode relates to closed-loop operation.

7. The system according to claim 1 wherein:
    upon detecting a switching event indicating re-routing of the optical signal from the first node to the second node via an alternate path, the first node via the first control logic generates and transmits an open-loop message to the second node directing transmission component associated with the second node to assume a first operational mode;
    the open-loop message is routed via the intermediate nodes;
    upon receiving and examining the open-loop message, each intermediate node causes its associated transmission component to assume the first operational mode;
    upon receiving the open-loop message, the second node via the second control logic generates and transmits an open-loop acknowledge message to the first node indicating that the transmission component associated with the second node has assumed the first operational mode;
    upon receiving the open-loop acknowledge message, the first node via the first control logic generates and transmits a closed-loop message to the second node directing the transmission component associated with the second node to assume a second operational mode;
    the closed-loop message is routed via the intermediate nodes; and
    upon receiving and examining the closed-loop message, each intermediate node causes its associated transmission component to assume the second operational mode.

8. The system according to claim 7 wherein the first operational mode relates to open-loop operation and the second operational mode relates to closed-loop operation.

9. The system according to claim 7 wherein the closed-loop message takes a predetermined period of time to be routed between two adjacent intermediate nodes.

10. A method for managing optical signals in an optical network having a plurality of nodes, comprising:

transmitting an optical signal and a message associated with the optical signal from a source node to a destination node;

upon receipt of the message associated with the optical signal, transmitting an acknowledge message from the destination node to the source node;

prior to activating a transmission component associated with the source node to transmit the optical signal, transmitting an enable message to the destination node via one or more intermediate nodes requesting permission to activate the transmission component associated with the source node;

upon receiving and examining the enable message at each intermediate node, directing transmission component associated with that intermediate node to assume a first operational mode;

upon receiving the enable message at the destination node, transmitting an enable acknowledge message to the source node granting permission to activate the transmission component associated with the source node;

upon receiving the enable acknowledge message at the source node, transmitting a transmitter OK message to the destination node indicating that transmission component associated with the source node has been activated and is operational;

upon receiving the transmitter OK message at the destination node, transmitting a receiver OK message to the source node indicating that the transmission component associated with the destination node has been activated and is ready to receive the optical signal;

transmitting the receiver OK message via the one or more intermediate nodes; and upon receiving and examining the receiver OK message at each intermediate node, directing transmission component associated with that intermediate node to assume a second operational mode.

11. The method according to claim 10 further comprising:
determining from the message associated with the optical signal and the acknowledge message whether the optical signal is received successfully at the destination node.

12. The method according to claim 10 further comprising at an intermediate node traversed by the message associated with the optical signal and the acknowledge message:
examining the message associated with the optical signal and the acknowledge message to obtain received signal power information;
calculating a desired output signal power level for optical signals to be transmitted from the intermediate node;
adjusting a selected level based on the received signal power information; and
maintaining the desired output signal power level by using the adjusted selected level.

13. The method according to claim 12 further comprising:
upon detecting a switching event, setting the selected level to a predetermined level without regard to the received signal power information.

14. The method according to claim 10 wherein the first operational mode relates to open-loop operation and the second operational mode relates to closed-loop operation.

15. The method according to claim 10 further comprising:
upon detecting a switching event indicating re-routing of the optical signal from the source node to the destination node via an alternate path, transmitting an open-loop message to the destination node directing transmission component associated with the destination node to assume a first operational mode;

transmitting the open-loop message via one or more intermediate nodes;

upon receiving and examining the open-loop message at each intermediate node, directing transmission component associated with that intermediate mode node to assume the first operational mode;

upon receiving the open-loop message at the destination node, transmitting an open-loop acknowledge message to the source node indicating that the transmission component associated with the destination node has assumed the first operational mode;

upon receiving the open-loop acknowledge message at the source node, transmitting a closed-loop message to the destination node directing the transmission component associated with the destination node to assume a second operational mode;

transmitting the closed-loop message via the one or more intermediate nodes; and upon receiving and examining the closed-loop message at each intermediate node, directing transmission component associated with that intermediate node to assume the second operational mode.

16. The method according to claim 15 wherein the first operational mode relates to open-loop operation and the second operational mode relates to closed-loop operation.

17. The method according to claim 15 further comprising:
routing the closed-loop message between two adjacent intermediate nodes with a minimum latency.

18. An optical network comprising:
a plurality of nodes, each configured to transmit and receive one or more optical signals;
a plurality of wavelength managers, each associated with a corresponding node and configured to generate, monitor, transmit and receive one or more messages;
a plurality of gain stages, each associated with a corresponding node and configured to transmit one or more optical signals;
wherein when an optical signal is originated by a source node for transmission to a destination node, the wavelength manager associated with that source node generates and transmits a message related to the optical signal to the destination node;
wherein upon receiving the message, the wavelength manager associated with the destination node generates and transmits an acknowledge message to the source node;
wherein prior to activating the gain stage associated with the source node to transmit the optical signal, the wavelength manager associated with the source node generates and transmits an enable message to the destination node requesting permission to activate the gain stage associated with the source node;
wherein the enable message is routed via the one or more intermediate nodes;
wherein upon receiving and examining the enable message at each intermediate node, the wavelength manager associated with the intermediate node directs the gain stage associated with that intermediate node to assume a first operational state;
wherein upon receiving the enable message, the wavelength manager associated with the destination node generates and transmits an enable acknowledge message to the source node granting permission to activate the gain stage associated with the source node;

wherein upon receiving the enable acknowledge message, the wavelength manager associated with the source node generates and transmits a transmitter OK message to the destination node indicating that the gain stage associated with the source node has been activated and is operational;

wherein upon receiving the transmitter OK message, the wavelength manager associated with the destination node generates and transmits a receiver OK message to the source node indicating that a signal receiver associated with the destination node has been activated and is ready to receive the optical signal;

wherein the receiver OK message is routed via the one or more intermediate nodes; and wherein upon receiving and examining the receiver OK message at each intermediate node the wavelength manager associated with that intermediate node directs the gain stage associated with that intermediate node to assume a second operational state.

19. The optical network according to claim 18 wherein the message related to the optical signal and the acknowledge message are transmitted between the source and destination nodes via an optical supervisory channel.

20. The optical network according to claim 18 wherein the message related to the optical signal and the acknowledge message are transmitted between the source and destination nodes via a transmission path traversed by the optical signal.

21. The optical network according to claim 20 wherein:
the transmission path includes one or more intermediate nodes; and
a wavelength manager associated with an intermediate node examines the message related to the optical signal and the acknowledge message in order to determine received input signal power levels.

22. The optical network according to claim 21 further comprising:
a power manager associated with the intermediate node and configured to calculate a desired output power signal level for the optical signals to be transmitted from the gain stage associated with the intermediate node; and
wherein the wavelength manager associated with the intermediate node adjusts the gain stage associated with the intermediate node based on the received input signal power levels to maintain the desired output power signal level.

23. The optical network according to claim 22 wherein at least one or more of the plurality of gain stages each includes a variable optical attenuator configured to amplify or attenuate the optical signals to be transmitted from the gain stage so as to achieve the desired output power signal level.

24. The optical network according to claim 22 wherein:
upon detecting a switching event indicating re-routing of the optical signal from the source node to the destination node via an alternate path, the wavelength manager associated with the source node generates and transmits an open-loop message to the destination node directing the gain stage associated with the destination node to assume a first operational mode;

the open-loop message is transmitted via the one or more intermediate nodes;

upon receiving and examining the open-loop message at each intermediate node, the wavelength manager associated with that intermediate node directs the gain stage associated with that intermediate node to assume the first operational mode;

upon receiving the open-loop message at the destination node, the wavelength manager associated with the destination node generates and transmits an open-loop acknowledge message to the source node indicating that the gain stage associated with the destination node has assumed the first operational mode;

upon receiving the open-loop acknowledge message at the source node, the wavelength manager associated with the source node generates and transmits a closed-loop message to the destination node directing the gain stage associated with the destination node to assume a second operational mode;

the closed-loop message is transmitted via the one or more intermediate nodes; and upon receiving and examining the closed-loop message at each intermediate node, the wavelength manager associated with that intermediate node directs the gain stage associated with that intermediate node to assume the second operational mode.

25. The optical network according to claim 24 wherein the first operational mode relates to open-loop operation and the second operational mode relates to closed-loop operation.

26. The optical network according to claim 24 wherein the closed-loop message is routed between two adjacent intermediate nodes with a minimum latency.

27. The optical network according to claim 21 wherein upon detecting a switching event, the wavelength manager associated with the intermediate node ceases to adjust the gain stage associated with the intermediate node to maintain the desired output power signal level.

28. The optical network according to claim 18 wherein the first operational mode relates to open-loop operation and the second operational mode relates to closed-loop operation.

* * * * *